United States Patent Office  3,567,388
Patented Mar. 2, 1971

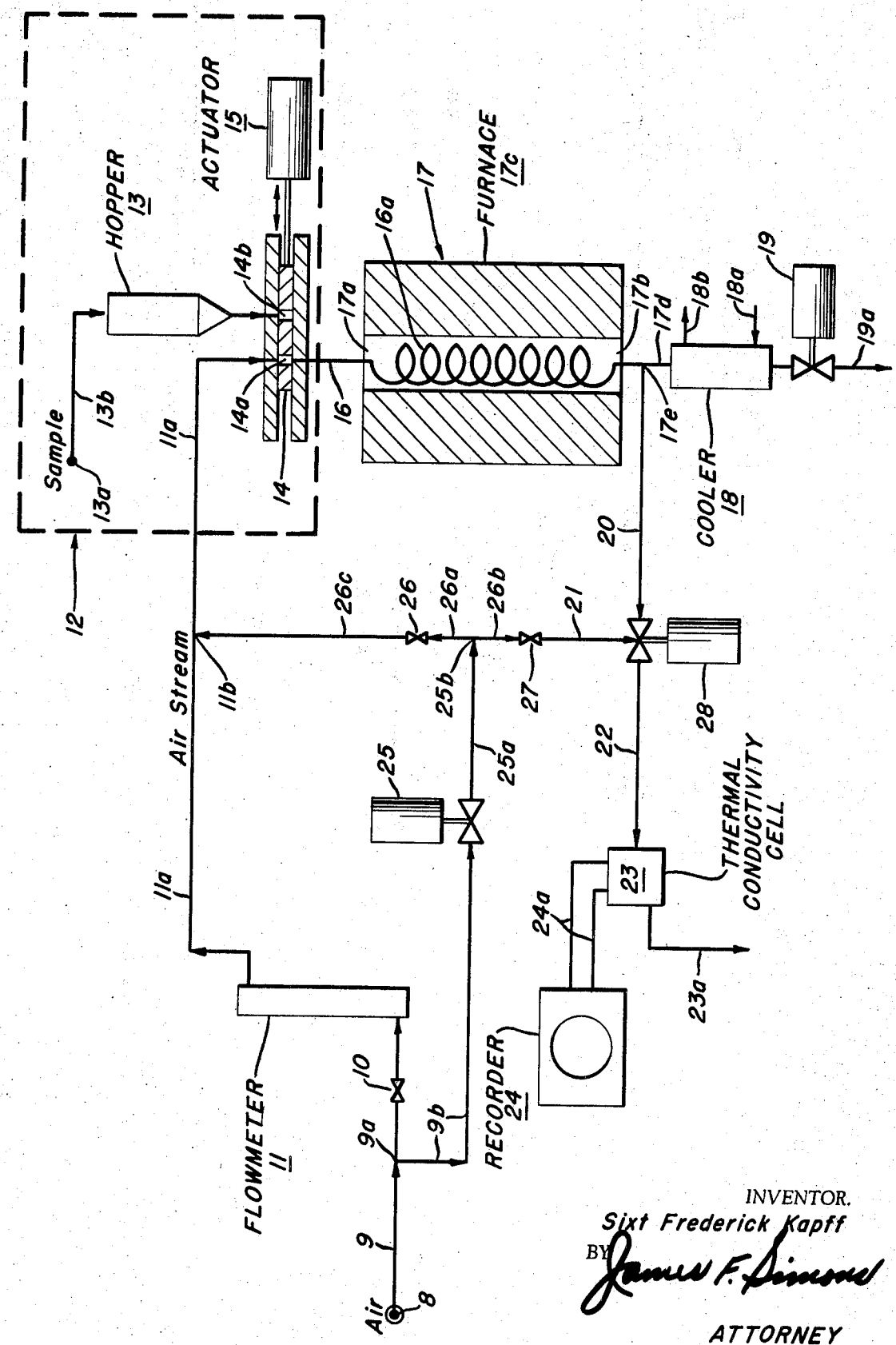

3,567,388
APPARATUS FOR DETERMINING CARBON ON CATALYST
Sixt Frederick Kapff, Homewood, Ill., assignor to Standard Oil Company, Chicago, Ill.
Filed Jan. 30, 1968, Ser. No. 701,632
Int. Cl. G01n 31/10, 31/12
U.S. Cl. 23—253                      5 Claims

ABSTRACT OF THE DISCLOSURE

Apparatus and method for determining the amount of carbon deposited on a catalyst, such as a hydrocarbon cracking catalyst, including combustion means, means for introducing a catalyst having carbon deposits into the combustion means, means for determining and recording the amount of carbon burned off the catalyst, and means for purging the system.

BACKGROUND OF THE INVENTION

It has long been desired that a means and method be devised for simply and rapidly determining the amount of carbon deposited on a catalyst in many areas of endeavour in the petroleum and chemical industries. In many processes operated in these industries various types of catalyst are subjected to environments wherein carbon deposits form on the surface and in the particulate catalyst.

Frequently, an entire process may be upset by the excessive carbon deposits which can occur on the catalytic agent. Accelerated buildup of high levels of carbon on catalyst often results in the process phenomenon termed "carbon runaway" well-known to those individuals skilled in the art. Excessive carbon deposits on various types of catalysts result in the production of off spec product and low yield.

For example, in the operatioin of a catalytic cracking unit, carbon is deposited on the catalyst particles and it must be burned off in a regenerator. The regenerated catalyst returned to the reactor is not carbon-free and often contains carbon at concentrations of up to and beyond 0.50% depending upon the particular unit and the operating variables. Having the facility to rapidly ascertain the amount of carbon on the regenerated catalyst is desirable and affords invaluable assistance in the operation of the process. Specifically, under some operating conditions carbon runaway occurs resulting in the quick buildup of carbon deposit on the catalyst to very high percentage. This accelerated buildup causes inefficient unit operations until carbon is lowered. An additional example of the need for this novel method and apparatus exists in units using molecular sieve catalyst. Some of these units operate most efficiently when the carbon level on regenerated catalyst is maintained around 0.20%. The unit efficiency is substantially decreased when carbon buildup on the catalyst occurs.

The methods and apparatus known in the art for determining the amount of carbon on catalyst include such techniques as removing a catalyst sample manually from a unit, cooling it and carrying it to a laboratory to perform the necessary laboratory test; the technique utilizing the time required to burn the carbon from a fixed amount of catalyst contained in a tube; and the technique utilizing darkness measurements of the sample. In each of these methods time or sensitivity limitations are inherent and provide definite undesirable aspects for quickly and accurately determining the amount of carbon on a catalyst.

Accordingly, it has now been found that a simple and rapid apparatus and method can accurately determine the amount of carbon on a catalyst to provide almost immediate information to an operator of a process so that corrective action can be taken before any sizable buildup of carbon occurs to prevent off spec production, low process yield, etc.

None of the known art appears to suggest nor render obvious the novel apparatus and method disclosed and claimed herein.

SUMMARY OF THE INVENTION

This invention concerns the measurement of carbon contained on and in a catalyst. The invention particularly relates to the accurate measurement of carbon on a catalyst being employed in a process such as catalytic cracking, where the catalyst is subjected to the deposition of carbon and the accurate and rapid measurement of carbon is desirable in order to maintain a highly efficient unit operation.

The novel apparatus of this invention includes in combination, a combustion means having an inlet and an outlet, the combustion means communicating with a sample introduction means at the inlet, a means for measuring and recording the carbon emitted as a combustion product from the combustion means, and means for purging the apparatus after each measurement of the carbon deposited on the catalyst sample.

The combustion means is operated at a temperature of at least about 1,600° F., the temperature required being sufficient to burn off the carbon on the catalyst sample as the sample moves through the combustion zone.

The sample introduction means can include any type of operative structural elements that will simply and efficiently introduce a measured amount of catalyst sample to the combustion means. The measuring and recording means includes a thermal conductivity cell and a recorder.

The means for purging the apparatus includes automatic devices for routing the flow of a purging stream through the apparatus.

BRIEF DESCRIPTION OF THE DRAWING

The accompanying drawing is a schematic diagram providing the essential detail where necessary of this novel apparatus and method for determining the amount of carbon on a catalyst.

DESCRIPTION OF A PREFERRED EMBODIMENT

Referring to the drawing, an air source is numerically designated 8 and is connected through needle valve 10 to flowmeter 11 by line 9. Adjoining line 9 at junction 9a is line 9b. Flowmeter 11 communicates through line 11a with sample means 12 having hopper 13, slide valve 14 and actuator 15 connected in operative relationship. Combustion means 17 communicates at its inlet end 17a with sample means 12 through line 16. Combustion zone 16a extends through the combustion means to the outlet 17b. Surrounding the line 16a within the combustion means 17 is furnace 17c for supplying the heat to support combustion to the elongated combustion zone. Extending through outlet 17b is line 17d having T 17e with line 20 extending therefrom. Line 17d extends from outlet 17b through cooler 18 and solenoid valve 19. Line 20 extends from T 17e to solenoid valve 28. Valve 28 is connected to thermal conductivity cell 23 by line 22. Recorder 24 is electrically connected to cell 23 by lines 24a.

Line 9b connecting line 9 at junction 9a communicates with solenoid valve 25. Line 25a extends from valve 25 to line junction 25b. Valve 26 is connected to junction 25b by line 26a and line 26b connects junction 25b with valve 27. Line 26c forms the communication between valve 26 and line 11a joining at junction 11b. Line 21 forms the communication between valve 27 and valve 28.

In operation, the sample means 12 having hopper 13 communicating with sample source 13a can be any operative arrangement; in fact, the sample source can be a transfer line and line 13b and hopper 13 can be a pipe. The sample source 13a communicates with the slide valve 14 into which the sample of catalyst is deposited in a predetermined measured amount. Actuator 15 programmed for movement at particular times during the system cycle is actuated by means (not shown).

Air from air source 8 is introduced into the system through line 9 and needle valve 10. The air can be any air having a known carbon dioxide content. The air source can be free of carbon dioxide. Often pure oxygen or enriched air is used. The air can have any reasonable and operative pressure depending upon the total system design. Throughout the specification the fluid from source 8 is referred to as air and such reference does not imply any intent to limit the type of material utilized from this source.

The air from source 8 passing through needle valve 10 into the flowmeter 11 has a predetermined volumetric rate regulated by the adjustment at needle valve 10 gaged by the flowmeter 11. The air passes from flowmeter 11 through line 11a and into and through the sample means 12. This air under pressure provides the motive force to move the catalyst sample from the slide valve 14 and particularly from the sample cavity 14b into line 16 and inlet 17a of combustion means 17 and combustion zone 16a.

The catalyst sample moving from hopper 13 into the sample cavity 14b of the slide valve 14 is moved into position between line 11a and line 16 by the actuation of actuator 15 and the air under pressure in line 11a moves the measured amount of catalyst sample into the combustion zone 16a of the combustion means 17. When this occurs the actuator 15 moves the sample valve 14 back into its original position so that sample cavity 14b is located directly below hopper 13 and opening 14a of slide valve 14 is coincident with line 11a and line 16 to permit the continued passage of air under pressure through inlet 17a of combustion means 17. Within the combustion means 17 furnace 17c surrounding the combustion zone 16a provides heat for the combustion of carbon contained on and in the catalyst particles of the sample. The furnace provides heat in amounts necessary for complete combustion of the carbon deposited on the catalyst. The minimum temperature sufficient to burn off all of the carbon content on the catalyst sample depends upon the length of time the catalyst resides within the zone. The minimum temperature is probably about 1,600° F. and may be 2,000° F. or more depending upon the length of the combustion zone 16a which is generally determinative of the amount of time required to move the sample through the combustion zone. The combustion zone may provide a circuitous path as shown in the drawing by the configuration of zone 16a in order to establish sufficient residence time at the particular operating temperature of the zone and the pressure of the air stream to assure the complete combustion of the deposited carbon.

The combustion products from the combustion zone 16a are moved out of the combustion means 17 through outlet 17b and line 17d to T 17e. The gaseous combustion products including carbon dioxide and water are routed through line 20, valve 28, line 22, to thermal conductivity cell 23, where the thermal conductivity, being a function of the composition of the combustion products, is measured. One mode of operation can be as follows. After the combustion products are moved to the thermal conductivity cell, the remaining solid particulate catalyst sample is moved by the motive force of the air stream under pressure from the combustion zone 16a through outlet 17b and line 17d into cooler 18 for temperature reduction in the cooler while the carbon content of the combustion products in thermal conductivity cell 28 is being measured. A preferred mode of operation can be that the catalyst moves into the cooler and through it after valve 19 is open during the commencement of purging when an increased air rate can be initiated to provide a greater motive force. Cooler 18 can be any type of satisfactorily operative means for reducing the temperature of the solid catalyst. The cooler 18 is depicted in the drawing with inlet 18a and outlet 18b for the circulation of a heat exchange medium. The cooled catalyst is removed from the system in accordance with the particular program through solenoid valve 19 and exhaust line 19a.

The thermal conductivity cell 23 can be of a conventional type having dual cavities, each provided with a resistance element. One cavity contains air as a reference, and the other cavity receives the combustion products from line 22. The wires in the respective cavities are connected to a Wheatstone bridge and the change in electrical resistance of the wire within the cavity receiving the combustion products permits the determination of the carbon content within the products of the combustion zone.

The thermal conductivity cell 23 electrically connected to recorder 24 through line 24a has such an arrangement that proper calibration permits the direct reading of carbon content from the recorder. The recorder can be any of the many conventional types available for this purpose. The thermal conductivity cell is equipped with an exhaust line 23a.

After the measurement of the thermal conductivity of the sample and the recording thereof, the system program provides for the purging of the lines, combustion zone, etc. The air from source 8 is allowed to move through junction 9a and line 9b by the programmed actuation of solenoid valve 25. The purging air stream passes through line 25a to junction 25b where it is diverted through lines 26a and 26b. Needle valves 26 and 27 permit passage of the purging air stream through lines 21 and 26c. The purging stream passes via junction 11b to line 11a and through slide valve 14, sample cavity 14b, and into line 16.

The purging air stream is directed into the combustion zone 16a of the combustion means 17 via inlet 17a for the purging, or removal of any contaminants that might remain from the last sample. The purging air stream passes from the combustion zone 16a through outlet 17b of the combustion means 17 and into the cooler 18 via line 17d.

Solenoid valve 28 allows the passage of the purging air stream through needle valve 27 and line 21 to be directed into line 20 and T 17e. At T 17e the purging air stream moves through cooler 18 and is exhausted therefrom through solenoid valve 19 and exhaust line 19a.

The apparatus and system are so programmed that each step occurs in accordance with a predetermined schedule. The program essentially provides for the introduction of a measured amount of a catalyst sample to the combustion zone of a combustion means. The novel method and apparatus further provides for the complete combustion of carbon deposited on the catalyst sample so that the combustion products including carbon dioxide and water can be moved to a means for measuring the carbon dioxide contained in the combustion products. Also provided is the simple and novel means and method for purging the system after each sample in order to prevent the plugging of the combustion zone, lines and valves with catalyst. A thermal conductivity cell is utilized herein; however, any means for measuring carbon dioxide may be employed and is intended to be within the purview of this invention. Similarly, any means for recording the results is also within the purview of this invention.

In a specific operation exemplifying the operativeness of the novel method and apparatus taught herein, air or any other similarly suitable fluid at approximately room temperature can be introduced into the system. In one operation about 600 cubic centimeters per minute of air as measured by the flowmeter 11 were allowed to pass through needle valve 10 and line 11a. A particulate catalyst sample having a volume of 0.028 cubic centimeters was transferred from the sample cavity 14b to a position coincident with line 11a and line 16 so that the sample was moved into the combustion zone 16a through line 16 and inlet 17a of the combustion means 17. In this specific run the temperature produced within the combustion zone 16a by furnace 17c located around the zone was about 1,700° F. The combustion zone having the circuitous path depicted in the drawing and numerically designated 16a was a stainless steel tube having a length of from about 2½ feet to about 3½ feet and an internal diameter of about ⅜ inches. During the residence time of the sample of catalyst within the combustion zone 16a substantially all of the carbon deposited thereon was oxidized to carbon dioxide and the carbon dioxide and water forming essentially the combustion products thereof were transported through outlet 17b, line 17d, T 17e, lines 20 and 22, and valve 28, to the thermal conductivity cell 23. In the conductivity cell the carbon dioxide was measured and the calibrated instrument recorded a direct reading of carbon on the sample. The lines and valves of the apparatus were actuated to permit the complete purging of the instrument in preparation for the next cycle. The cycle time was about 90 seconds. The percent of the carbon contained in the catalyst was read directly from the recorder with an accuracy within about ±0.05 percent carbon. Samples of catalyst having from about 0.20 to about 35.0 weight percent carbon based upon the weight of catalyst have been measured accurately.

In conclusion, it is apparent that many variables exist herein so that depending upon the engineering design and the size of the apparatus a wide range of conditions may exist such as the volumetric flow of air and the air pressure, the size of the sample and its carbon content, the size and length of the combustion zone 16a, the temperature within the combustion zone and the residence time of the sample therein. Similarly, any of the many available means for measuring carbon dioxide and for recording may be employed within the purview of the invention.

The invention is described by reference to the specific embodiments defined and claimed herein; however, it is understood that the embodiments are not intended to limit the scope of the invention, but these embodiments are presented only to teach the best modes contemplated for practising this invention.

Having thus described the invention, what is claimed is:

1. Apparatus for measuring the amount of carbon on a catalyst sample, said appartus being operable between a combustion cycle and a purging cycle and including:
   a source of pressurized gas comprising, at least in part, oxygen;
   combustion means having an inlet into which are introduced gas from said source and a measured amount of sample, and an outlet from which are withdrawn products of combustion and catalyst;
   means for measuring a predetermined amount of sample, said measuring means being generally in alignment with the inlet;
   first line means connecting the source of gas and the sample measuring means so that the pressurized gas forces the measured amount of sample into the inlet, said first line means including flow meter means for regulating the flow of gas into the inlet;
   means for measuring the amount of carbon dioxide present in the combustion products withdrawn from the combustion means;
   second line means connecting the outlet of the combustion means and the carbon dioxide measuring means so that carbon dioxide flows into said carbon dioxide measuring means, said second line means including first valve means for controlling the flow therethrough in accordance with the cycle of the apparatus; and
   third line means connected between the source of gas and the combustion means and having a first branch connected to the first line means downstream from the flow meter means and a second branch connected to the second line means, said third line means including second valve means for controlling the flow therethrough in accordance with the cycle of the apparatus;
   said first and second valve means during the combustion cycle being set so that carbon dioxide flows in a first direction through said second line means directly into the measuring means and during the purging cycle being set so that said pressurized gas flows through the combustion means to purge said combustion means of catalyst and through the second line means in a second direction opposite that of said first direction to purge said second line means of catalyst.

2. The apparatus of claim 1 wherein the sample measuring means is above the combustion means.

3. The apparatus of claim 1 wherein the combustion means includes a heating element having a passageway therein, and circuitous line means extending through said passageway and having its terminal ends at the inlet and outlet of the combustion means, respectively.

4. The apparatus of claim 1 additionally including cooler means connected to the outlet of the combustion means for cooling catalyst withdrawn from the combustion means.

5. The apparatus of claim 1 wherein the carbon dioxide measuring means include a thermal conductivity cell having an output connected to recorder means.

References Cited

UNITED STATES PATENTS

| | | | |
|---|---|---|---|
| 2,753,246 | 7/1956 | Shields et al. | 23—230PC |
| 2,984,542 | 5/1961 | Kleiber | 23—230PCX |
| 3,116,979 | 1/1964 | Kapff | 23—253PC |
| 3,129,060 | 4/1964 | Pohlenz | 23—230X |
| 3,414,382 | 12/1968 | Kapff et al. | 23—230PC |
| 3,322,504 | 5/1967 | Capuano | 23—253XPC |
| 3,475,131 | 10/1969 | Keulemans | 23—253PC |

JOSEPH SCOVRONEK, Primary Examiner

U.S. Cl. X.R.

23—230